US009619354B2

(12) United States Patent
Basile et al.

(10) Patent No.: US 9,619,354 B2
(45) Date of Patent: Apr. 11, 2017

(54) MOBILE DEVICE AND CHASSIS WITH CONTACTLESS TAGS TO DIAGNOSE HARDWARE AND SOFTWARE FAULTS

(71) Applicant: International Business Machines Corporation, Armonk, NY (US)

(72) Inventors: Ryan M. Basile, Shoreline, WA (US); Dana L. Price, Cary, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 14/482,390

(22) Filed: Sep. 10, 2014

(65) Prior Publication Data
US 2016/0070629 A1  Mar. 10, 2016

(51) Int. Cl.
*G06F 17/30* (2006.01)
*G06F 11/22* (2006.01)
(Continued)

(52) U.S. Cl.
CPC ....... *G06F 11/2252* (2013.01); *G01M 99/005* (2013.01); *G06F 17/3053* (2013.01);
(Continued)

(58) Field of Classification Search
CPC ........ G06Q 10/06; G06Q 10/20; G07C 5/008; G07C 5/006; G07C 5/0841; G07C 2205/02;
(Continued)

(56) References Cited

U.S. PATENT DOCUMENTS 7,796,039 B2  9/2010  Brillhart et al.
8,025,227 B2 * 9/2011  Hall ................. G06F 17/30575
                                                   235/385
(Continued)

FOREIGN PATENT DOCUMENTS

CN  203217352 U  9/2013
WO  2011094124 A1  8/2011
WO  2013077977 A1  5/2013

OTHER PUBLICATIONS

Wikipedia, "Near field communication," Wikipedia: the Free Encyclopedia, http://en.wikipedia.org/wiki/Near_Field_Communication, Accessed on Apr. 21, 2014.

*Primary Examiner* — Christopher Stanford
(74) *Attorney, Agent, or Firm* — David Zwick

(57) ABSTRACT

Diagnosing faults in a hardware appliance. Information is read by a hand-held reader from one or more contactless tags associated with one or more components in a hardware appliance. One or more component faults and/or issues are identified based on the read information. A query is formed based on the identified one or more component faults and/or issues. A diagnostic database in the hand-held reader is queried, based on the formed query, and one or more query results are displayed in a ranked order on a display of the hand-held reader. In one aspect of the embodiments, the information read from the one or more contactless tags includes a pointer to a datastore in one of the one or more components. An ad hoc wireless network connection is established with the hardware appliance, and information in the datastore is downloaded over the connection.

4 Claims, 8 Drawing Sheets

(51) Int. Cl.
*G01M 99/00* (2011.01)
*G06Q 10/00* (2012.01)
*G06F 11/07* (2006.01)
*H04Q 9/00* (2006.01)

(52) U.S. Cl.
CPC .......... *G06F 11/07* (2013.01); *G06F 11/0766* (2013.01); *G06F 11/0784* (2013.01); *G06F 17/30575* (2013.01); *G06Q 10/20* (2013.01); *H04Q 9/00* (2013.01); *H04Q 2209/47* (2013.01); *H04Q 2209/70* (2013.01); *H04Q 2209/75* (2013.01)

(58) Field of Classification Search
CPC ... G07C 5/0808; G07C 5/085; G06F 11/0784; G06K 19/0723
See application file for complete search history.

(56) References Cited

U.S. PATENT DOCUMENTS

| | | | |
|---|---|---|---|
| 8,573,481 B1 | 11/2013 | Ryan et al. | |
| 8,810,369 B2* | 8/2014 | Ackley | H04Q 9/00 |
| | | | 235/454 |
| 2008/0081608 A1 | 4/2008 | Findikli et al. | |
| 2010/0038415 A1* | 2/2010 | Leutgeb | G06K 7/0008 |
| | | | 235/375 |
| 2014/0065971 A1* | 3/2014 | Nonaka | G06F 11/0736 |
| | | | 455/41.2 |

* cited by examiner

MOBILE DEVICE AND CHASSIS WITH CONTACTLESS TAGS TO DIAGNOSE HARDWARE AND SOFTWARE FAULTS

BACKGROUND

The present invention relates generally to the field of storing system information on a contactless readable tag, and more particularly to storing current and past system status information on a near field communication tag affixed to or located near the system.

SUMMARY

Embodiments of the present invention disclose a method, computer program product, and system for diagnosing faults in a hardware appliance. Information is read by a hand-held reader from one or more contactless tags associated with one or more components in a hardware appliance. One or more component faults and/or issues are identified based on the read information. A query is formed based on the identified one or more component faults and/or issues. A diagnostic database in the hand-held reader is queried, based on the formed query, and one or more query results are displayed in a ranked order on a display of the hand-held reader.

In one aspect of the embodiments, the information read from the one or more contactless tags includes a pointer to a datastore in one of the one or more components. An ad hoc wireless network connection is established with the hardware appliance, and information in the datastore is downloaded over the connection.

In another embodiment of the invention in which a hardware appliance includes one or more components, a fault is detected in a component of the hardware appliance. Information associated with the component fault is written to a datastore in a component of the hardware appliance. A pointer to the datastore is written into a contactless tag of the hardware appliance. In response to detecting a power fail in the hardware appliance, key information associated with the fault is written from the datastore to a tag of the hardware appliance.

DETAILED DESCRIPTION

Figure 1:
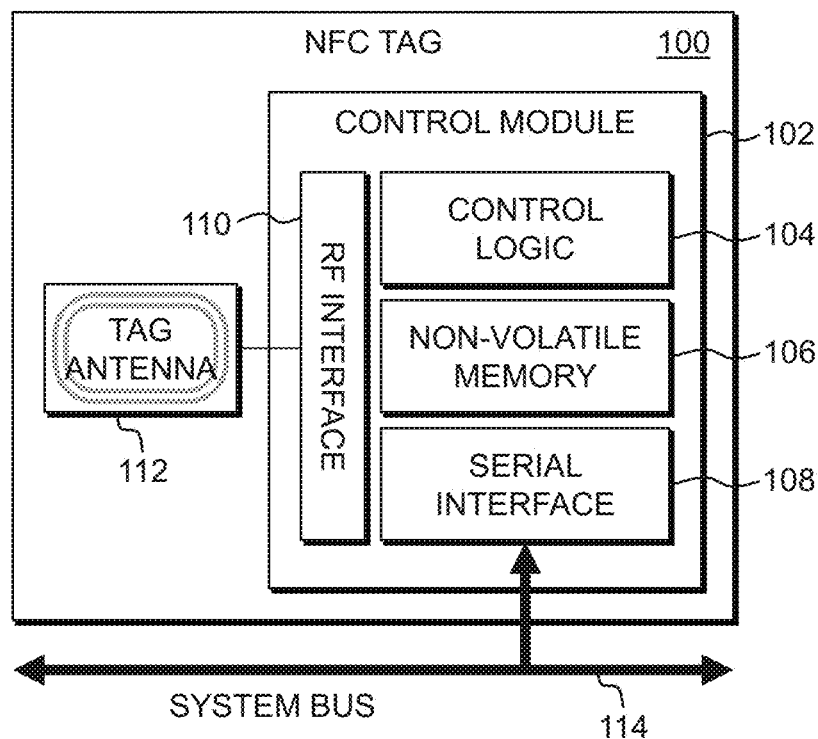
FIG. 1 is a functional schematic diagram of an NFC tag, in accordance with an embodiment of the invention.

Embodiments of the present invention are directed generally to a system that may quickly identify and diagnose faults and other issues in an integrated hardware environment. Many computing hardware appliances provide complex capabilities through an aggregation of hardware subsystems. The hardware subsystems of these appliances are often integrated within a chassis that may provide power and communication busses that couple the subsystems together. A desirable aspect of these hardware appliances may be a small form factor. However, a chassis with a small form factor may present obstacles to easy access to the hardware subsystems of the chassis.

When a hardware system experiences a fault, identification of the fault may be aided by LED lights on the system enclosure, or on a circuit board faceplate, that may display, for example, an error code. If a chassis contains many hardware subsystems, it may be difficult to identify which functional component has experienced the fault. This may be compounded if different chassis have different physical arrangements of hardware subsystems. A typical approach is to attach labels with serial numbers and/or bar codes to the subsystem enclosure or faceplate. However, this may require a technician responding to a fault to look up the serial number in paper or softcopy documentation. In many facilities that may house the hardware appliance, cameras may not be allowed, which may restrict the use of certain bar code readers.

In various embodiments of the invention, a system to identify and diagnose hardware subsystem faults and/or other issues is described that takes advantage of near field communication (NFC) technology. In one embodiment, an NFC tag may be physically attached to a subsystem component at a location that may be easily accessible by a technician. The NFC tag may be connected, for example, by a communication bus to a processor of the component. When a fault occurs in the component, the processor may write information into the memory of the tag, via, for example, the communication bus, that can assist the technician in identifying the component and in determining and diagnosing the fault. In one embodiment, information specific to the fault may be written to a datastore of the component, and a pointer to the location of the datastore is written to the tag. When a tag reader reads the component tag, an alternate communication link, for example, Bluetooth® or another wireless protocol, may be established between the tag reader and the component, and the tag reader may download the fault information from the datastore at the address read from the tag.

In another embodiment, if a power fail is detected and the tag contains fault information that has not yet been read, the component may write key fault information into the tag. In this manner, even though the component may not have power, key information to assist with fault diagnosis may still be read from the tag by the tag reader. In another embodiment, a bank of NFC tags on the appliance chassis, for example, on an NFC tag panel, may be accessible to a tag reader. In one aspect, each tag may be associated with a particular component. In another aspect, the bank of tags may be considered to be an extended datastore associated with the hardware appliance and may be managed by a tag bank controller. In this aspect, for example, a "directory"

may be stored in a particular tag that indicates the tag of the tag bank where fault or other information associated with a specific component has been written.

After fault information and, in certain embodiments, other status and performance information from all components, has been read from the NFC tags by the tag reader, the information is used to, for example, query a diagnostic database on the tag reader to present to a technician one of more diagnoses and/or solutions to address the component fault(s).

The present invention will now be described in detail with reference to the figures. FIG. 1 is a functional schematic diagram of an NFC tag, in accordance with an embodiment of the invention. In an exemplary embodiment of the invention, an NFC tag is used to store information, that may be read by an NFC reader, that may assist in diagnosing a system or subsystem fault. NFC technology is generally characterized by its ability to support "contactless" communication between a tag and a reader. Here, contactless means that a galvanic connection between the tag and reader is not required. Another characteristic of NFC technology is that the maximum range of a typical NFC reader is about 4 cm. Although embodiments of the invention described herein make use of NFC technology, those of skill in the art will recognize that other current and/or future contactless tag technologies may be used, in accordance with embodiments of the invention.

Exemplary NFC tag 100 includes control module 102 and tag antenna 112. Control module 102 includes control logic module 104, non-volatile memory 106, serial interface 108, and RF interface 110.

Control logic module 104 controls the overall functions of NFC tag 100. In an exemplary embodiment, NFC tag 100 operates in accordance with a set of specifications and/or standards. For example, the specifications and/or standards may include: European Computer Manufacturers Association (ECMA) standards 340 and 352, Near Field Communication—Interface and Protocol, parts 1 and 2, respectively; International Organization for Standardization/International Electrotechnical Commission (ISO/IEC) 14443-1:2008 Part 1: Physical characteristics; ISO/IEC 14443-2:2010 Part 2: Radio frequency power and signal interface; ISO/IEC 14443-3:2011 Part 3: Initialization and anticollision; and ISO/IEC 14443-4:2008 Part 4: Transmission protocol. In addition to these standards, other organizations, for example, the NFC Forum, have established accepted standards further defining NFC architecture, interoperability, devices, and protocols. In addition to these standards, various organizations have developed application programming interfaces (APIs) to standardize the use of, and allow easier integration of, NFC based applications on various platforms, such as Android® and iOS® platforms.

Non-volatile memory 106 is a datastore for storing information that may be read by an NFC reader. Typically, non-volatile memory has a capacity in the range of 96 bytes to about 32 Kbytes, although much larger capacities may be possible. Serial interface 108 interfaces non-volatile memory 106 to an external system bus 114, and allows data from a computing device connected to the system bus to write data to the memory via the bus and serial interface module.

With regard to user data stored in non-volatile memory 106, there are very few restrictions. Various standards, specifications, and APIs allow for easy reading and writing of common data types, for example, URLs. However, those of skill in the art will recognize that custom data in many different formats may be read from and written to an NFC tag.

RF interface 110 controls the modulation of tag antenna 112, by which the antenna transmits data stored in non-volatile memory 106. Generally, RF interface 110 detects when a sufficient induced voltage in tag antenna 112 has been caused by impinging radio frequency electromagnetic waves from, for example, an NFC reader. RF interface 110, under the control of control logic module 104, then modulates the induced voltage in tag antenna 112 as a means for transmitting data stored in non-volatile memory 106 to, for example, the NFC reader. Tag antenna 112 typically is a loop antenna on a dielectric backing that is tuned to a particular frequency defined in a set of standards. For NFC technology, the current standard frequency is 13.56 MHz.

Figure 2:
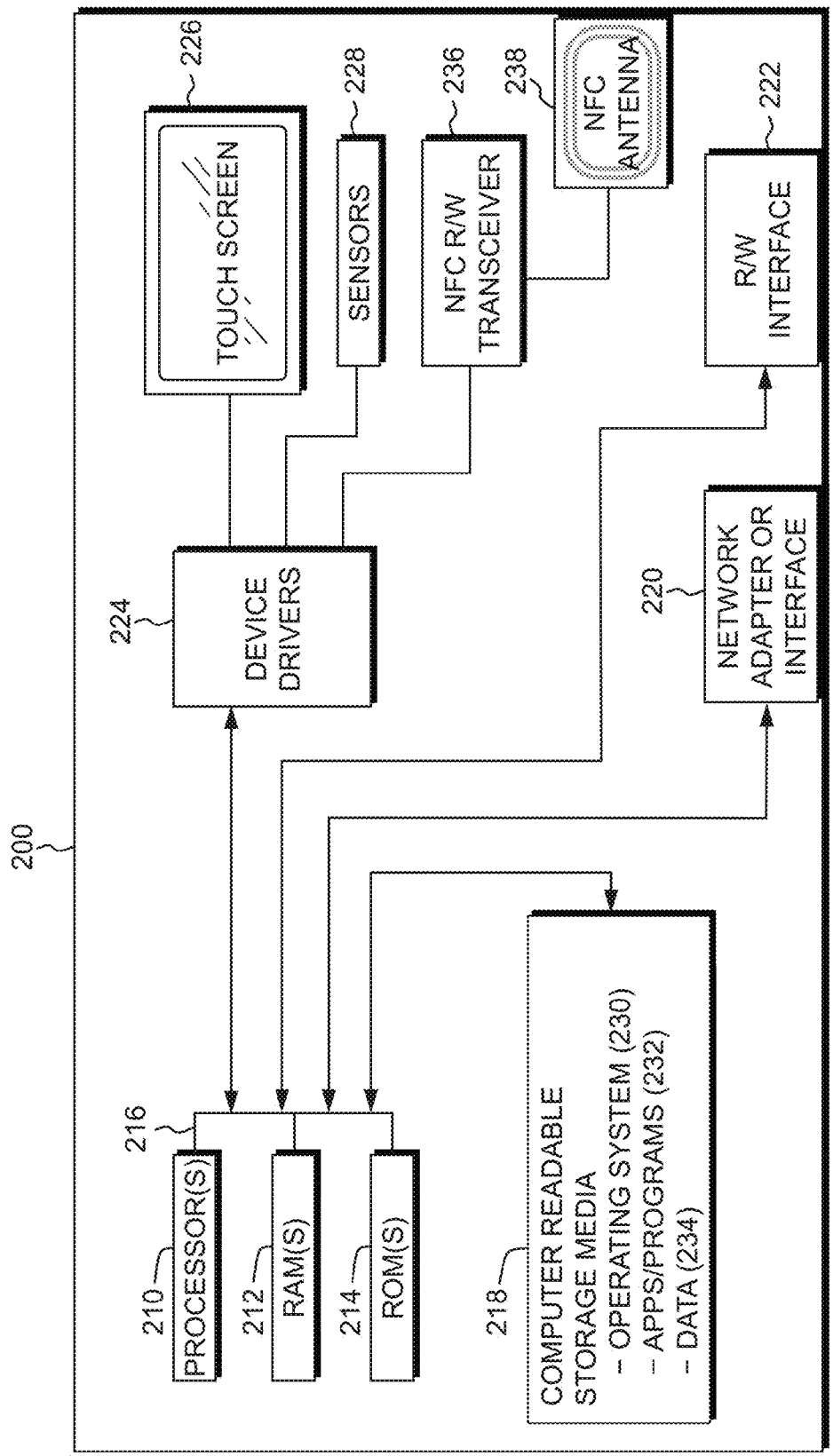
FIG. 2 is a functional block diagram of an NFC reader, in accordance with an embodiment of the invention.

FIG. 2 is a functional block diagram of an NFC reader 200, in accordance with an embodiment of the invention. In an exemplary embodiment, NFC reader 200 may be a multi-function device that incorporates not only NFC technology, but also other communication technologies, such as Bluetooth, WiFi, CDMA/TDMA/GSM, etc. For example, the NFC technology may be incorporated into a smartphone.

In an exemplary embodiment, NFC reader 200 includes one or more processors 210, one or more computer readable RAMs 212, one or more computer readable ROMs 214, and one or more computer readable storage media 218 on one or more buses 216. One or more operating systems 230, one or more apps or programs 232, and data 234 are stored on the one or more computer readable storage media 218 for execution by one or more of the processors 210 via one or more of the RAMs 212 (which typically include cache memory). In the illustrated embodiment, each of the computer readable storage media 218 is a semiconductor storage device such as ROM 214, EPROM, flash memory or any other computer readable storage media that can store a computer program and digital information. Alternatively, one or more of the computer readable storage media 218 is a magnetic disk storage device of an internal hard drive.

NFC reader 200 may also include a read/write (R/W) interface 222, for example, a USB port, to read from and write to external computing devices. The apps and programs 232 and the data 234 can be stored on the external computing devices, read via the R/W interface 222 and loaded onto the computer readable storage media 218.

NFC reader 200 may also include a network adapter or interface 220, such as a TCP/IP adapter card or wireless communication adapter (such as a 4G wireless communication adapter using OFDMA technology, Bluetooth, WiFi, etc.). The apps and programs 232 and the data 234 can be downloaded to NFC reader 200 from an external computer or external storage device via a network (for example, the Internet, a local area network, a wide area network, or a wireless network) and network adapter or interface 220. From the network adapter or interface 220, the apps and programs 232 and the data 234 may be loaded into computer readable storage media 218.

NFC reader 200 may also include a touch screen 226, sensors 228, for example, touch screen sensors and magnetically sensitive circuits, NFC R/W transceiver 236 and NFC antenna 238, and device drivers 224 to interface to touch screen 226 for imaging, to sensors 228 for pressure sensing of alphanumeric character entry and user selections and for detecting magnetic flux and polarity, and to NFC R/W transceiver 236. The device drivers 224, R/W interface 222 and network adapter or interface 220 may comprise hardware and software (stored in computer readable storage media 218 and/or ROM 214).

It should be appreciated that FIG. 2 provides only an illustration of one NFC reader implementation and does not imply any limitations with regard to the environments in which different embodiments may be implemented. Many modifications to the depicted environment may be made.

In an exemplary embodiment, NFC reader operates according to a set of standards and/or specifications, for example, the set of standards and specifications described above in relation to the operation of NFC tag 100. Apps and programs 232 include program logic for interacting with NFC tag 100. At the lower layers, this interaction may be controlled by APIs from a standardized library, such as an API library directed to an Android or iOS platform. In simplified exemplary operation, NFC reader 200 is brought within the operational range of NFC tag 100. NFC tag 100 responds to a continuous "discover" message transmitted by a modulated signal from NFC antenna 238 by, for example, "waking up" and transmitting its unique tag identifier (UID) stored in, for example, non-volatile memory 106. When the UID of NFC tag 100 has been received by NFC reader 200, data that may reside in non-volatile memory 106 of the tag may be read by the NFC reader, and the NFC reader may transmit data to store in the non-volatile memory of the tag.

As mentioned above, in one embodiment, a bank of NFC tags on the appliance chassis, for example, on an NFC tag panel, may be accessible to a tag reader. See, for example, NFC tag panel 414, FIG. 4. In this physical arrangement, NFC reader 200 may receive simultaneous responses from more than one tag in response to the discover message transmitted by the reader. Those of skill in the art will recognize that anti-collision routines may be incorporated into the apps and programs 232 used by NFC reader 200 to limit transceiver operations to a particular NFC tag at a time. For example, a list of responding tags may be displayed by the reader, allowing selection of a particular tag. In another embodiment, certain information may be read from each responding tag, for example, component identification and status information, which may be displayed by the reader, allowing selection of a particular tag.

Additional functionality at the application level is described below in relation to FIG. 7 for processing of data read by NFC reader 200 from non-volatile memory 106 of an NFC tag 100.

Figure 3:
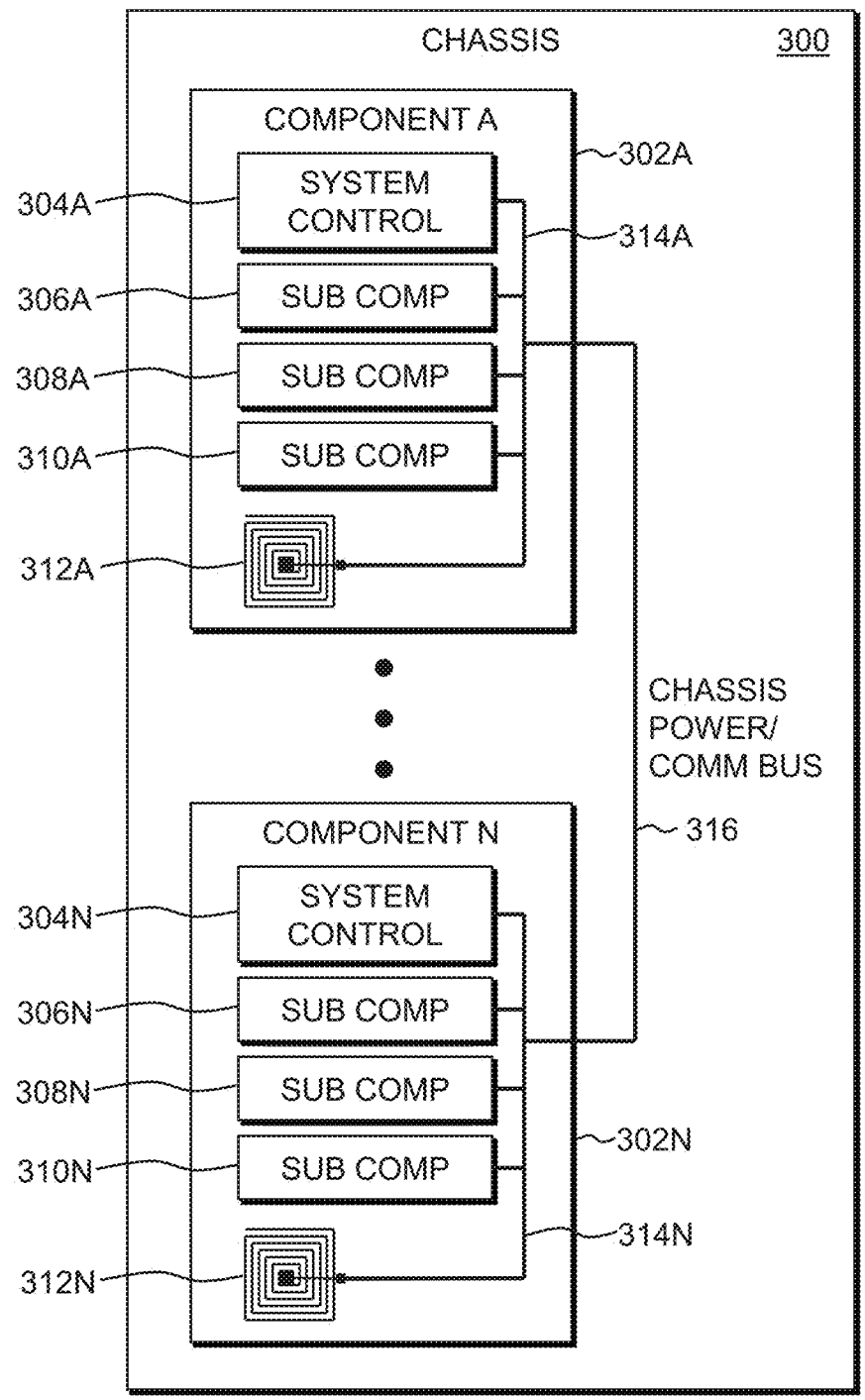
FIG. 3 is a functional block diagram of a hardware appliance chassis, in accordance with an embodiment of the invention.

FIG. 3 is a functional block diagram of a chassis 300 of a hardware appliance, in accordance with an embodiment of the invention. Chassis 300 includes hardware components 302A to 302N, interconnected over a chassis power and communication bus 316. Components 302 represent subsystems within the hardware appliance, and may generally be described with reference to FIG. 8. For example, components 302 may include processing subsystems, storage subsystems, communications subsystems, etc. The particular form factors of components 302 may include, but are not limited to, separate enclosures, integrated enclosures, individual or integrated circuit boards, etc. In general, components 302 may represent any functional subsystem of a hardware appliance that may experience a fault that can be identified and diagnosed by a technician.

Each hardware component 302 may contain a system control module 304, and one or more subcomponents, represented by subcomponents 306-310, that may all be interconnected over a component bus 314, which may be coupled to chassis power and communication bus 316.

Each component 302 also includes one or more NFC tags 312, which may be coupled to system control module 304 and subcomponents 306-310 over component bus 314. As described above, NFC tag 312 may connect to component bus 314 via a serial interface, such as serial interface 108 (FIG. 1).

In an exemplary embodiment, a system control module 304 may write information to the non-volatile memory of the NFC tag 312, for example, non-volatile memory 106, associated with the component 302 via the component bus 314 and, for example, serial interface 108.

Figure 4:
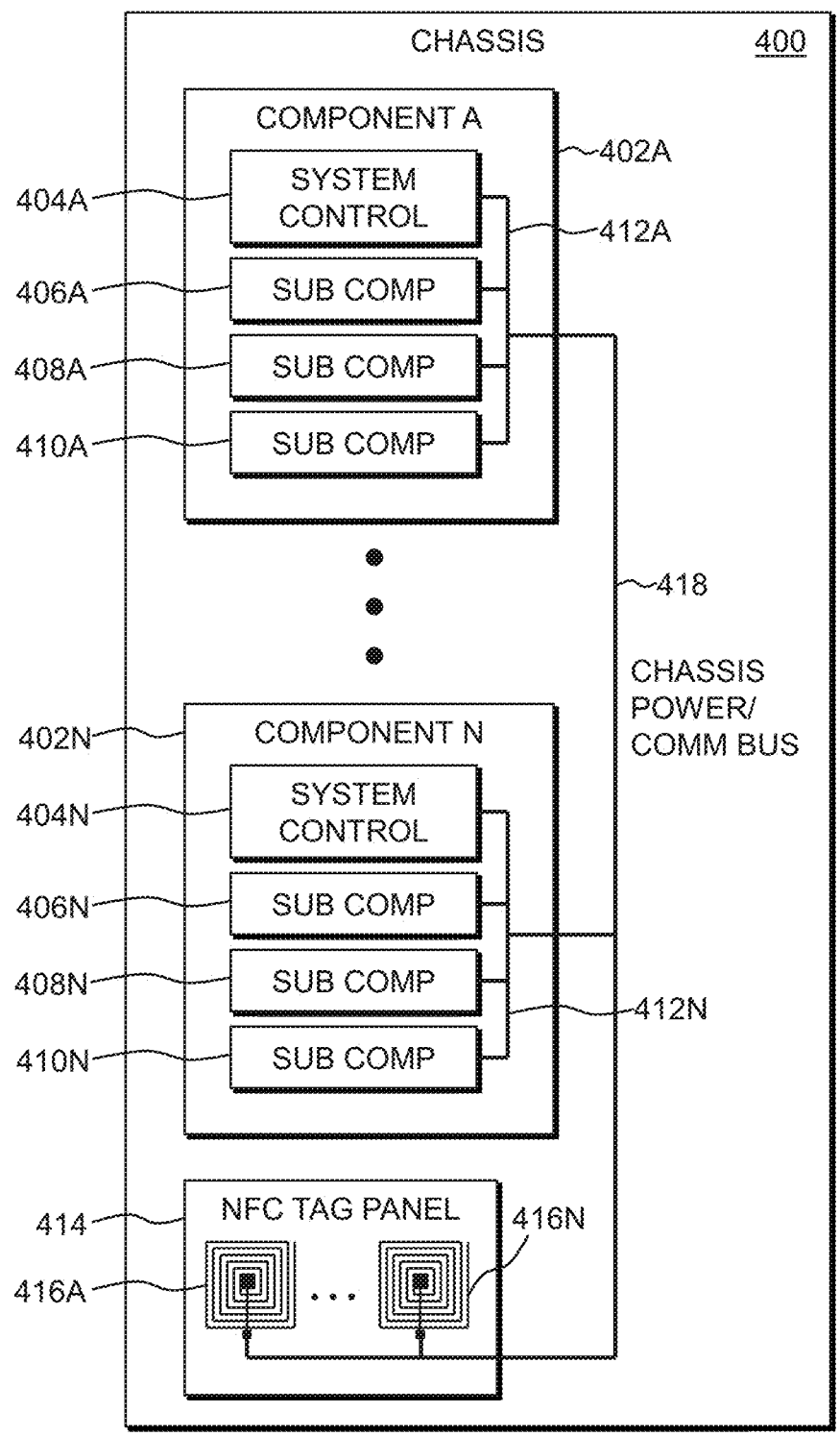
FIG. 4 is a functional block diagram of a hardware appliance chassis, in accordance with a second embodiment of the invention.

FIG. 4 illustrates an alternative embodiment of a chassis 400 of a hardware appliance, in accordance with an embodiment of the invention. Similar to the embodiment of FIG. 3, chassis 400 includes hardware components 402A to 402N, interconnected over a chassis power and communication bus 418. Each component 402, which may be described generally with reference to FIG. 8, may include a system control module 404, and one or more subcomponents 406-410, all interconnected over a component bus 412.

In this embodiment, rather than having an NFC tag attached to each component 402, a bank of NFC tags 416 is attached, for example, to an NFC tag panel 414 on chassis 400. The NFC tags 416 may be accessible to each component 402 via component buses 412 and chassis power and communication bus 418. In one aspect, one or more components 402 have one-to-one correspondences with one or more corresponding NFC tags 416. That is, each of the one or more components 402 is associated with its own unshared NFC tag 416. In an exemplary embodiment, each component 402 has a one-to-one correspondence with a corresponding NFC tag 416.

In another aspect, the bank of NFC tags 416 may be operated as a single storage system. For example, the non-volatile memory of all NFC tags 416 may be treated as a distributed datastore. For example, a control component, not shown, may control the specific tag and location in the tag into which data is written. A particular tag 416, for example, the "first" tag on NFC tag panel 414, may contain a directory of information written to the distributed datastore, and would be read first by an NFC reader. Specific implementation details, such as whether to allow information to span more than one tag, and whether to include defragmentation functionality, may be treated as design decisions based on such factors as the characteristics of each NFC tag 416.

In another aspect, the bank of NFC tags 416 may be operated to include a combination of NFC tags 416 having one-to-one correspondences with components 402, and one or more tags, operated individually, and/or, for example, in groups of two or more operated as a distributed datastore, treated as storage not dedicated to a single component.

In an exemplary embodiment, a system control module 404 may write information to the non-volatile memory of an NFC tag 416, for example, non-volatile memory 106, associated with the component 402 via the component bus 412, the chassis power and communication bus 418 and, for example, serial interface 108. In another embodiment, a system control module 304/404 may transmit information to write to an NFC tag 416 to a control component, not shown, associated with the bank of tags 416. The control component would control the specific location in the extended tag storage into which data is written.

Figure 5:
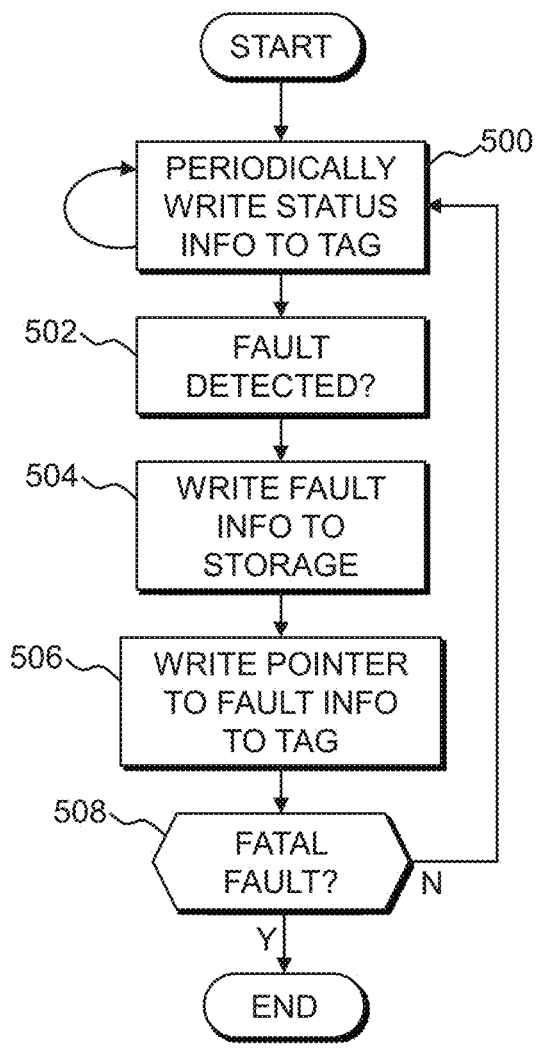
FIG. 5 is a flowchart depicting the operational steps that a hardware component of a hardware appliance may execute, in accordance with one or more embodiments of the invention.

FIG. 5 is a flowchart depicting the operational steps that a hardware component 302 or 402 of a hardware appliance may execute, in accordance with various embodiments of the invention. In an exemplary embodiment, a system control module 304/404 may periodically write component system status information to its associated NFC tag 312/416, or to a bank of tags 416 (step 500). This status information may include, for example, performance statistics, information that may be useful in identifying degradations in service, and/or other system information. The information may be written to an NFC tag, or, for example, the information may be written to a datastore in the component 302/402, for example, on a computer readable storage media 808 (or another location), with a pointer to the information written to the NFC tag.

If a fault is detected (step 502), via, for example, a system interrupt, the system control module 304/404 may write information associated with the fault to a datastore of the component 302/402 (step 504). The datastore may reside, for example, on a computer readable storage media 808. The information may include, for example, PSW and other register contents, dumps of certain locations in program and system memory, specific codes identifying the fault, etc. A pointer to the datastore location may be written to the tag(s) 312/416 associated with the component 302/402 (step 506).

If the fault is not fatal to the component 302/402 (step 508, "N" branch), program or other execution may continue on the component 302/402, and status information may continue to be periodically written to the tag(s) 312/416 associated with the component 302/402 (step 500). If the fault is fatal to the continuing program or other execution of component 302/402 (step 508, "Y" branch), this processing may end.

Figure 6:
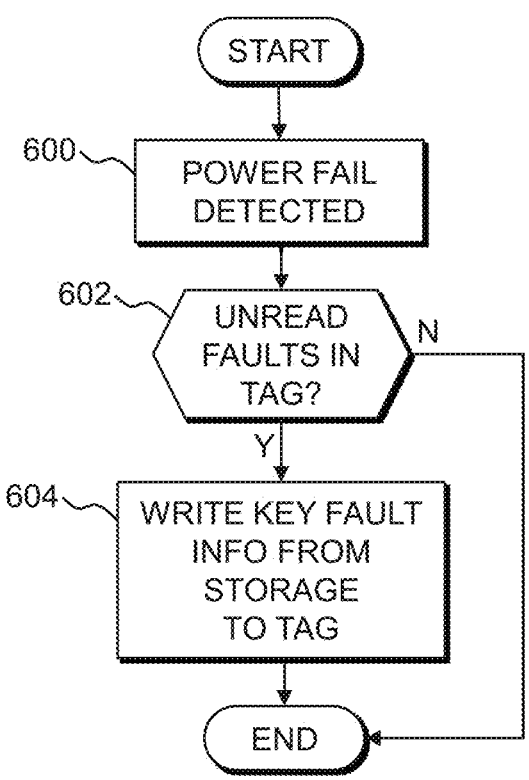
FIG. 6 is a flowchart depicting the operational steps that a hardware component of a hardware appliance may execute, in accordance with one or more embodiments of the invention.

FIG. 6 is a flowchart depicting the operational steps that a hardware component 302 or 402 of a hardware appliance may execute, in accordance with other various embodiments of the invention. In an exemplary embodiment, when a power fail of a component 302/402 is detected (step 600), a system control module 304/404 may determine if tag(s) 312/416 associated with the component 302/402 contain pointers to fault information that has not yet been read by an NFC reader (step 602). If tag(s) 312/416 associated with the component 302/402 contain pointers to fault information that has not yet been read (step 602, "Y" branch), the system control module 304/404 may retrieve at least key fault information associated with the unread fault from the datastore that contains this information, and write the retrieved fault information into tag(s) 312/416 associated with the component 302/402 (step 604). The component 302/402 may then continue with an orderly power fail shutdown of the component. In this manner, even though the component may not be able to properly operate, information related to the last fault(s) may be accessible to an NFC reader reading the fault information from the tag(s) 312/416 associated with the component 302/402.

Figure 7:
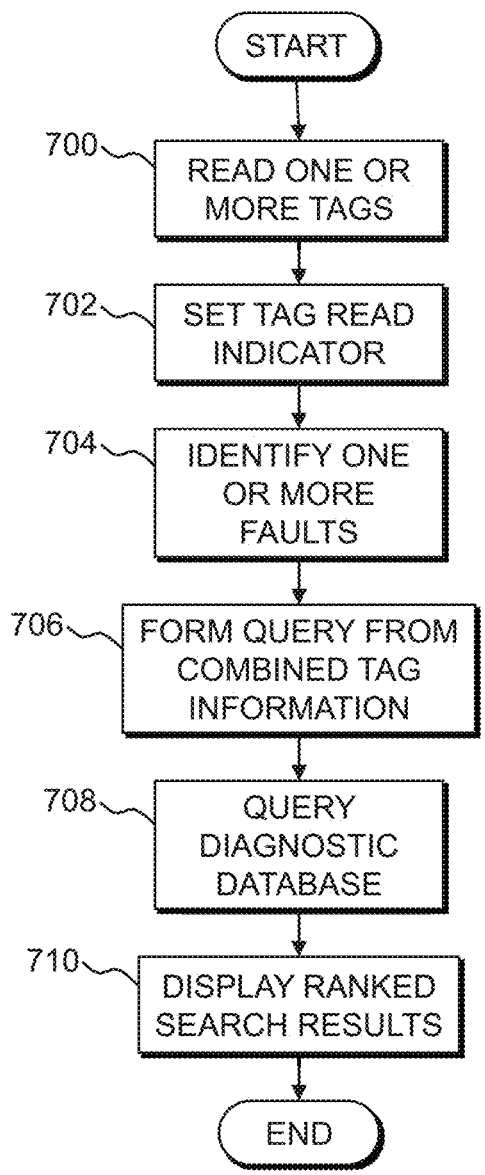
FIG. 7 is a flowchart depicting the operational steps that an NFC reader may execute, in accordance with an embodiment of the invention.

FIG. 7 is a flowchart depicting the operational steps that an NFC reader 200 may execute, in accordance with various embodiments of the invention. In an embodiment, when a technician receives notice of a fault on a component 302/402 of a hardware appliance, NFC reader 200 is brought physically within operational range of one or more NFC tags 312/416 associated with the component (step 700). For example, an indicator light on a component 302, or adjacent an NFC tag 416 on NFC tag panel 414, may indicate that the associated component has experienced a fault, and NFC reader 200 is brought within operational range of the NFC tag 312/416 associated with the component. In another example, after a notice of a fault is received, NFC reader 200 is brought within operational range of the first NFC tag 416 on NFC tag panel 414. Information read by NFC reader 200 from the first NFC tag 416 may indicate that information associated with a component fault is stored in another NFC tag 416. NFC reader 200 is then brought within operational range of the indicated NFC tag 416. In other embodiments, a technician responding to notice of a fault may read status and other information from each tag 312/416 in order to receive status and other information from all components 302/402 of a hardware appliance.

If the component 302/402 is in an operational state, the information associated with the fault stored in the NFC tag 312/416 may be a pointer to a location in a datastore containing specific fault information. In this embodiment, the NFC tag reader application on NFC reader 200, for example, an app or program 232, may, for example, initiate and establish a Bluetooth, WiFi, or other ad hoc or infrastructure-based wireless connection with the component 302/402, or with the hardware appliance, and download the information in the component 302/402 datastore to which the pointer in NFC tag 312/416 refers.

If the component 302/402 is not in an operational state, for example, as the result of a fatal fault or a loss of power, NFC tags 312/416 may contain certain key fault information rather than pointers to a datastore. In this embodiment, NFC tag reader 200 may read fault and other information directly from NFC tags 312/416.

In certain embodiments, information written to NFC tags 312/416 may be a combination of fault information and pointers to datastores on components 302/402 that may also contain fault information. The combination may be per NFC tag, or within an NFC tag.

When information from a tag 312/416 has been read, NFC reader 200 may write to the tag to set a status indicator, for example, one or more bits, to indicate that information has been read from the tag (step 702).

After information from one or more tags 312/416 has been read by NFC reader 200, an app or program 232 on NFC reader 200 may identify specific component and/or hardware appliance information, and specific faults and/or other issues from the information (step 704). In one embodiment, NFC reader 200 reads specific fault information associated with a component 302/402 from one or more NFC tags 312/416, as well as status, performance, and other information for some or all components 302/402 that may be written to the NFC tags. Based on this information, the app or program 232 on NFC reader 200 forms a query (step 706). The query may be, for example, keyword based, for example, the fault codes, a hash based query based on the combination of fault and other status and performance information read by NFC reader 200, etc. (step 706).

After the query has been formed, a diagnostic database residing, for example, on computer readable storage media 218 of NFC reader 200 as data 234, may be queried (step 708). The query results may then be displayed, for example, on touch screen 226, in a ranked order (step 710).

Figure 8:
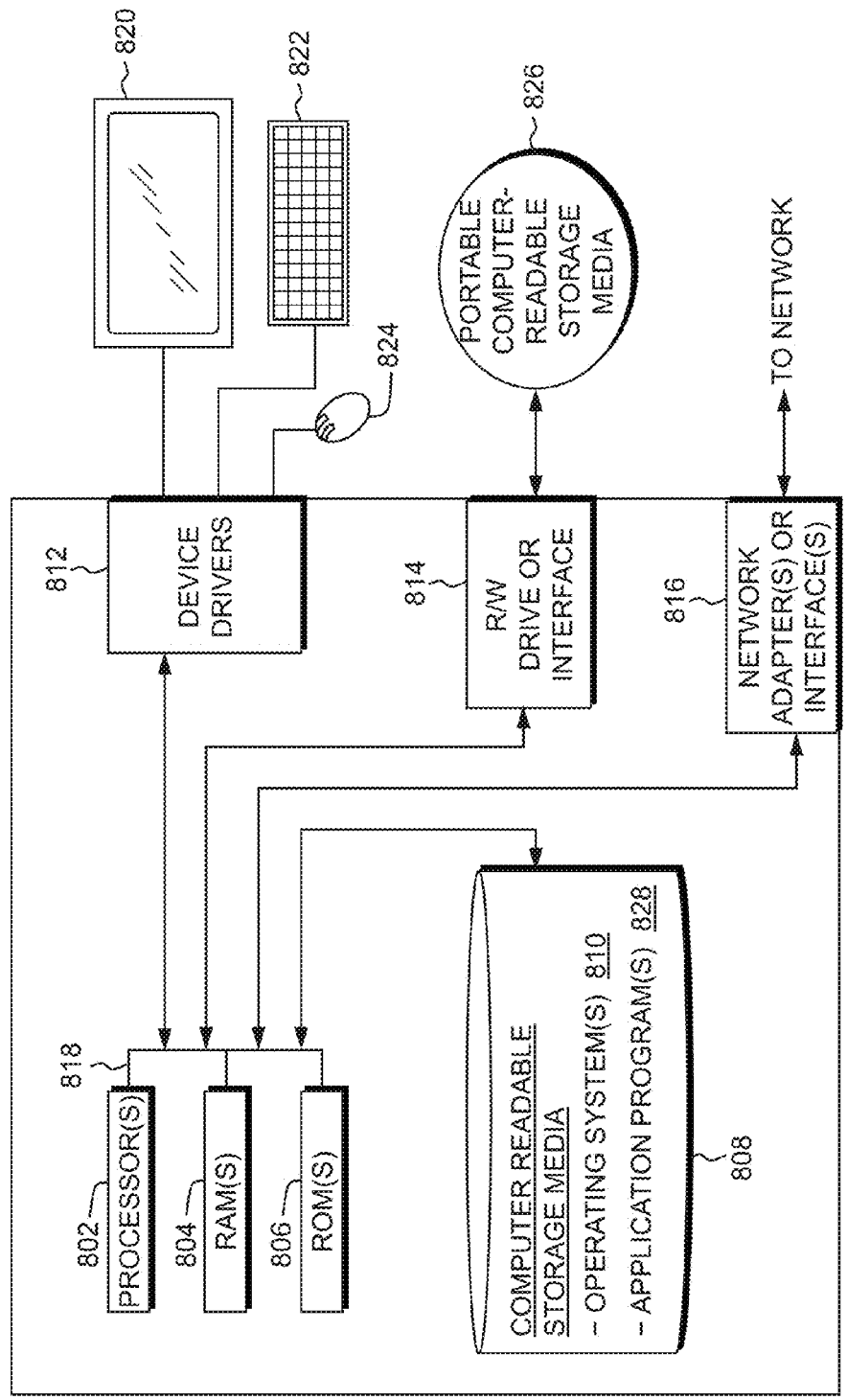
FIG. 8 is a functional block diagram of a component of a chassis of FIG. 3 or FIG. 4, in accordance with an embodiment of the invention.

FIG. 8 is a functional block diagram of a component 302/402 of a chassis 300/400 of FIG. 3 or FIG. 4, in accordance with an embodiment of the invention. It should be appreciated that FIG. 8 provides only an illustration of one implementation and does not imply any limitations with regard to the environments in which different embodiments may be implemented. Many modifications to the depicted environment may be made.

A component 302/402 may include one or more processors 802, one or more computer readable RAMs 804, one or more computer readable ROMs 806, one or more computer readable storage media 808, device drivers 812, read/write drive or interface 814, network adapter or interface 816, all interconnected over a communications fabric 818 (314/412). Communications fabric 818 may be implemented with any architecture designed for passing data and/or control information between processors (such as microprocessors, communications and network processors, etc.), system memory, peripheral devices, and any other hardware components within a system.

One or more operating systems 810, and one or more application programs 828 are stored on one or more of the computer readable storage media 808 for execution by one or more of the processors 802 via one or more of the respective RAMs 804 (which typically include cache memory). In the illustrated embodiment, each of the computer readable storage media 808 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage device that can store a computer program and digital information.

A component 302/402 may also include a R/W drive or interface 814 to read from and write to one or more portable computer readable storage media 826. Application programs 828 on a component 302/402 may be stored on one or more of the portable computer readable storage media 826, read via the respective R/W drive or interface 814 and loaded into the respective computer readable storage media 808.

A component 302/402 may also include a network adapter or interface 816, such as a TCP/IP adapter card, Bluetooth, WiFi, or other wireless communication adapter (such as a 4G wireless communication adapter using OFDMA technology). Application programs 828 on a component 302/402 may be downloaded to the computing device from an external computer or external storage device via a network (for example, the Internet, a local area network or other wide area network or wireless network) and network adapter or interface 816. From the network adapter or interface 816, the programs may be loaded onto computer readable storage media 808. The network may comprise copper wires, optical fibers, wireless transmission, routers, firewalls, switches, gateway computers and/or edge servers.

A component 302/402 may also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814 and network adapter or interface 816 may comprise hardware and software (stored on computer readable storage media 808 and/or ROM 806).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for diagnosing faults in a hardware appliance, the method comprising:
   providing a distributed contactless tag datastore that includes a plurality of contactless tags with a directory on one of the contactless tags with directory information that identifies one or more other contactless tags of the distributed contactless tag datastore on which information to be read is located, the distributed contactless tag datastore being associated with a plurality of components in a hardware appliance;
   receiving, by the distributed contactless tag datastore, information to be read, including: for each component in the hardware appliance that has experienced a fault, a pointer to a component datastore in the component, the component datastore containing information associated with the fault; status information for all components in the hardware appliance; and performance information for all components in the hardware appliance;
   reading, by a hand held reader, the directory information on the directory contactless tag that identifies the one or more contactless tags of the distributed contactless tag datastore on which information to be read is located;
   reading, by a hand held reader, the information to be read from the identified contactless tags of the distributed contactless tag datastore, the information to be read including one or more pointers to one or more respective different datastores on one or more components in the hardware appliance;
   marking, by a hand held reader, the identified contactless tags as having been read;
   establishing, by a hand held reader, an ad hoc wireless network connection with each of the one or more components in the hardware appliance having component datastores that are pointed to by the information read from the identified contactless tags;
   downloading, by a hand held reader over the ad hoc wireless network connections the information in the one or more pointed to component datastores;
   forming, by a hand held reader, a database query based on the fault information downloaded over the one or more ad hoc wireless network connections from the one or more pointed to datastores and the status and performance information;
   querying a diagnostic database in the hand-held reader, based on the formed query; and
   displaying a plurality of query results in a ranked order on a display of the hand-held reader.

2. A method in accordance with claim 1, wherein the hand-held reader reads the one or more contactless tags-in accordance with near field communications technology.

3. A system for diagnosing faults in a hardware appliance, the system comprising:
   a distributed contactless tag datastore that includes a plurality of contactless tags with a directory on one of the contactless tags with directory information that identifies one or more other contactless tags of the distributed contactless tag datastore on which information to be read is located, the distributed contactless tag datastore being associated with a plurality of components in a hardware appliance,
   the contactless tag datastore operated to receive information to be read, including: for each component in the hardware appliance that has experienced a fault, a pointer to a component datastore in the component, the component datastore containing information associated with the fault; status information for all components in the hardware appliance; and performance information for all components in the hardware appliance;
   a hand held reader, comprising one or more computer processors, one or more computer readable storage media, and program instructions stored on one or more of the computer readable storage media and executable by at least one of the one or more processors to cause the hand held reader to perform a method comprising:
   reading, by a hand held reader, the directory information on the directory contactless tag that identifies the one or more contactless tags of the distributed contactless tag datastore on which information to be read is located;

reading, by a hand held reader, the information to be read from the identified contactless tags of the distributed contactless tag datastore, the information to be read including one or more pointers to one or more respective different datastores on one or more components in the hardware appliance;

marking, by a hand held reader, the identified contactless tags as having been read;

establishing, by a hand held reader, an ad hoc wireless network connection with each of the one or more components in the hardware appliance having component datastores that are pointed to by the information read from the identified contactless tags;

downloading, by a hand held reader over the ad hoc wireless network connections the information in the one or more pointed to component datastores;

forming, by a hand held reader, a database query based on the fault information downloaded over the one or more ad hoc wireless network connections from the one or more pointed to datastores and the status and performance information;

querying a diagnostic database in the hand-held reader, based on the formed query; and displaying a plurality of query results in a ranked order on a display of the hand-held reader.

4. A computer system in accordance with claim 3, wherein the hand-held reader reads the one or more contactless tags in accordance with near field communications technology.

* * * * *